US012015273B2

(12) United States Patent
Lebeau et al.

(10) Patent No.: US 12,015,273 B2
(45) Date of Patent: Jun. 18, 2024

(54) ELECTRICITY DISTRIBUTION SYSTEM FOR A DOMESTIC INSTALLATION COMPRISING MULTIPLE ELECTRICAL SOURCES

(71) Applicant: Schneider Electric Industries SAS, Rueil Malmaison (FR)

(72) Inventors: Bernard Lebeau, Les Adrets (FR); Etienne Du Port De Poncharra, Crets en Belledonne (FR); Emmanuel Bur, La Buisse (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 17/947,247

(22) Filed: Sep. 19, 2022

(65) Prior Publication Data
US 2023/0098283 A1    Mar. 30, 2023

(30) Foreign Application Priority Data

Sep. 24, 2021  (FR) ...................................... 2110100
Jan. 14, 2022   (EP) ...................................... 22305033

(51) Int. Cl.
*H02J 3/00*      (2006.01)
*H02J 3/38*      (2006.01)

(52) U.S. Cl.
CPC .............. *H02J 3/007* (2020.01); *H02J 3/381* (2013.01); *H02J 2300/24* (2020.01)

(58) Field of Classification Search
CPC ......... H02J 3/007; H02J 3/382; H02J 2300/24
(Continued)

(56) References Cited

U.S. PATENT DOCUMENTS

| 11,223,204 B2 * | 1/2022 | Berenger .................. H02J 3/46 |
| 2020/0220354 A1 | 7/2020 | Berenger et al. |
| 2021/0083506 A1 | 3/2021 | Rao et al. |

FOREIGN PATENT DOCUMENTS

| FR | 2432789 A1     | 2/1980  |
| WO | 2016176727 A1  | 11/2016 |
| WO | 2018234330 A1  | 12/2018 |

OTHER PUBLICATIONS

Extended European Search Report dated Jun. 27, 2022 for corresponding European Patent Application No. 22305033.7, 5 pages.

* cited by examiner

*Primary Examiner* — Hal Kaplan
(74) *Attorney, Agent, or Firm* — Locke Lord LLP

(57) ABSTRACT

An electrical distribution system, for distributing electrical currents between an electrical distribution network and a domestic distribution installation, includes: a multi-source electrical switching unit allowing or preventing the circulation of electrical currents in two electrical conduction paths each including a plurality of electrical conductors, and an electrical connection device connected at the output of the electrical switching unit, the connection device being configured to prolong the two electrical conduction paths at the output of the switching unit. The electrical switching unit is configured to connect, on a first input, a first of the two electrical conduction paths to an electrical distribution network, the electrical switching unit being configured to connect, on its second input, the second of the two electrical conduction paths to an auxiliary electrical source. The connection device is configured to connect each electrical conduction path to one or more electrical loads at the output of the electrical switching unit. The electrical connection device includes an interconnection point in which the corresponding electrical conductors of each electrical conduc- (Continued)

tion path are connected to one another, the multi-source electrical switching unit forming a single disconnection point capable of simultaneously disconnecting the electrical sources connected to the first input and to the second input from the rest of the electrical distribution network.

10 Claims, 7 Drawing Sheets

(58) Field of Classification Search
USPC .......................................................... 307/43
See application file for complete search history.

ELECTRICITY DISTRIBUTION SYSTEM FOR A DOMESTIC INSTALLATION COMPRISING MULTIPLE ELECTRICAL SOURCES

TECHNICAL FIELD

The invention relates to an electricity distribution system for a domestic installation. The invention also relates to a method for managing such an electricity distribution system.

PRIOR ART

At present, it is common for domestic electricity distribution installations to be supplied by multiple electrical sources, for example by a public distribution network (or grid) and by a local supply source such as one or more photovoltaic (PV) generators.

Often, the local supply sources are connected up to existing distribution installations. This is the case, for example, when photovoltaic generators are fitted on a house which is already provided with a distribution installation.

For reasons of cost and ease of installation, it is frequently the case that these local supply sources are connected upstream of the distribution installation, on the arrival sides of the public distribution network, and downstream of the main circuit breaker 11 (FIG. 1).

In this case, the main circuit breaker 11 is incapable of protecting the local installation in the event that the total electrical current (I_total), which is equal to the sum of the current coming from the network (I_grid) and the current coming from the local source (I_PV), is greater than a safety threshold I_threshold (for example 63 amperes) when the two sources are generating electricity that is consumed by the loads of the domestic installation, since the main circuit breaker 11 is not located on the same branch of the installation as the local supply source.

Furthermore, in many cases domestic installations are not generally intended to supply high-power loads for long periods of time, which accentuates the risk of overloading the installation.

FIG. 1 represents an example of such a configuration, in which a domestic electricity distribution installation 10 is configured to be supplied by a public distribution network 12 and by photovoltaic generators 13, these two supply sources being connected by a common connection 14 to an input of the same distributor 16. The output of the distributor 16 is connected to conductors 18 which supply a plurality of domestic electrical loads 20.

With such a configuration, the main circuit breaker 11 may not be tripped when the total current (I_total) is greater than the safety threshold I_threshold (maximum current allowable by the switchboard, particularly at the node 14) while the current coming from the network (I_grid) remains less than the tripping threshold of the main circuit breaker 11.

Such a situation may create serious safety problems, such as a fire risk, and should therefore be avoided.

There is therefore a need for a domestic electrical installation which allows one or more secondary supply sources to be easily connected to the arrival sides of the supply network, without compromising the safety of the installation.

In particular, the installation should be easy to implement so that it can be installed easily by electricians without the need to construct complex distribution switchboards and without requiring a large number of connectors and connecting wires, which are time-consuming and expensive to implement.

SUMMARY OF THE INVENTION

For this purpose, one aspect of the invention relates to an electrical distribution system for distributing electrical currents between an electrical distribution network and a domestic distribution installation, wherein the system comprises:
- a multi-source electrical switching unit configured to switch between two states respectively allowing or preventing the circulation of electrical currents in two electrical conduction paths each comprising a plurality of electrical conductors;
- an electrical connection device connected at the output of the electrical switching unit, the connection device being configured to prolong the two electrical conduction paths at the output of the switching unit;

wherein the electrical switching unit is configured to connect, on a first input, a first of the two electrical conduction paths to an electrical distribution network, the electrical switching unit being configured to connect, on its second input, the second of the two electrical conduction paths to an auxiliary electrical source;

wherein the connection device is configured to connect each electrical conduction path to one or more electrical loads at the output of the electrical switching unit; and wherein the electrical connection device comprises an interconnection point in which the corresponding electrical conductors of each electrical conduction path are connected to one another, the multi-source electrical switching unit forming a single disconnection point capable of simultaneously disconnecting the electrical sources connected to the first input and to the second input from the rest of the electrical distribution network.

According to advantageous but not compulsory aspects, such a system may incorporate one or more of the following characteristics, taken individually or in any technically feasible combination:
- The electrical connection device forms an H-bridge for each electrical phase or neutral line.
- The electrical connection device comprises connection conductors made of an electrically conductive material, each connection conductor being associated with an electrical phase or with a neutral line.
- The electrical connection device comprises, for each electrical phase or neutral line, a set of electrical conductors comprising:
  - at least one first conductor for forming the first electrical conduction path associated with this phase or neutral line,
  - at least one second conductor for forming the second electrical conduction path associated with this phase or neutral line, and
  - an interconnection point associated with this phase or neutral line, which connects the at least one first conductor to the said at least one second conductor of this phase or neutral line.
- Each interconnection point of the electrical connection device has a rating of 63 amperes.
- Each interconnection point of the electrical connection device has a rating of 125 amperes.
- Each of the first electrical conduction path and the second electrical conduction path of the electrical connection device has a rating of 63 amperes.

One portion of the electrical loads is capable of being connected to the first electrical conduction path and another portion of the electrical loads is capable of being connected to the second electrical conduction path.

The auxiliary electrical source comprises one or more photovoltaic generators.

The invention also relates to an installation comprising an electrical distribution installation, in particular for domestic use, comprising an electrical distribution system as defined above.

BRIEF DESCRIPTION OF THE FIGURES

The invention will be better understood, and other advantages thereof will become clearer, from the following description of an exemplary embodiment of a system, which is given only by way of example and is provided with reference to the appended drawings, in which.

DETAILED DESCRIPTION OF EMBODIMENTS OF THE INVENTION

Figure 2:
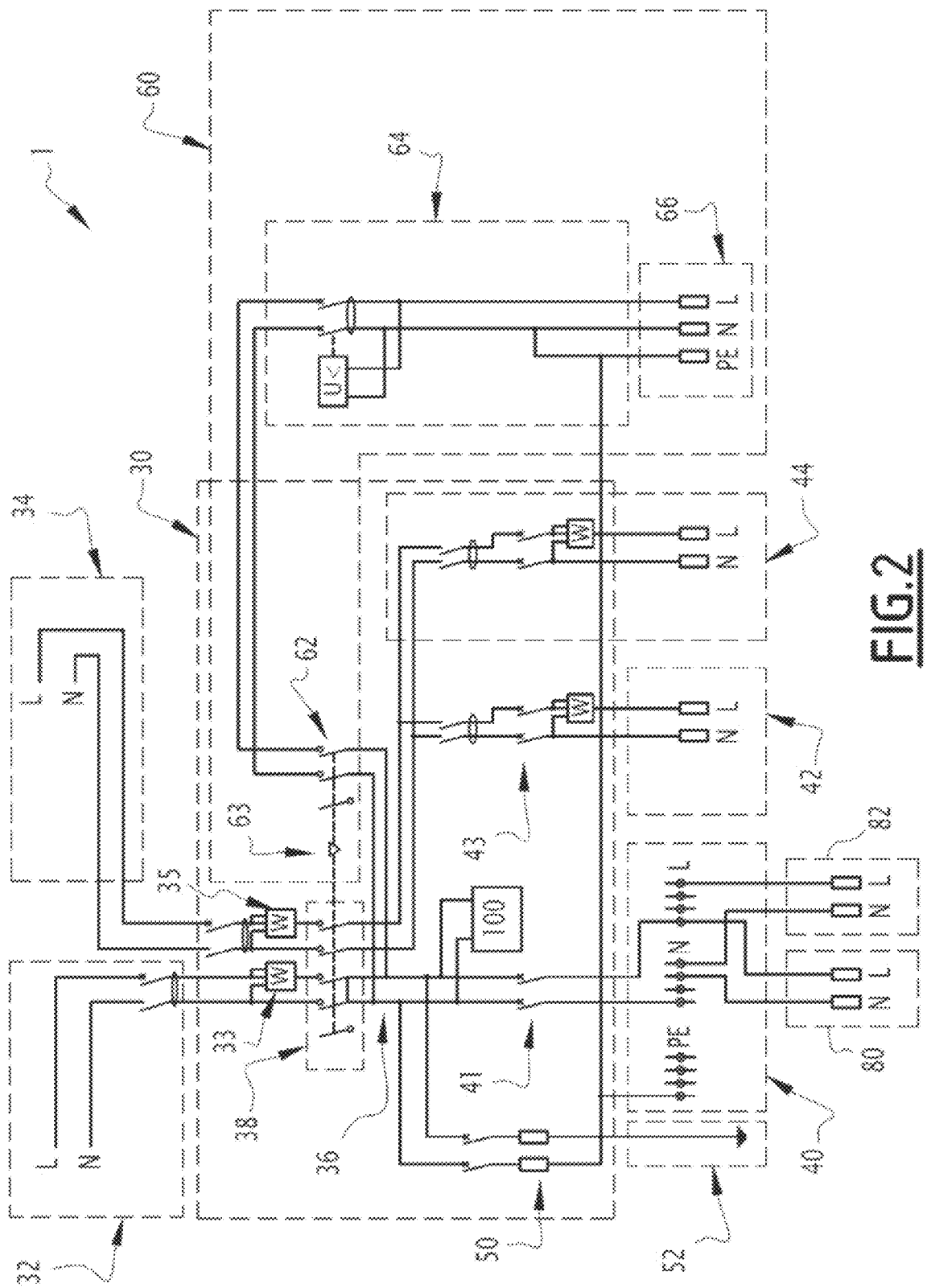
FIG. 2 schematically represents an electrical installation comprising an electrical distribution system according to the invention.
Figure 3:
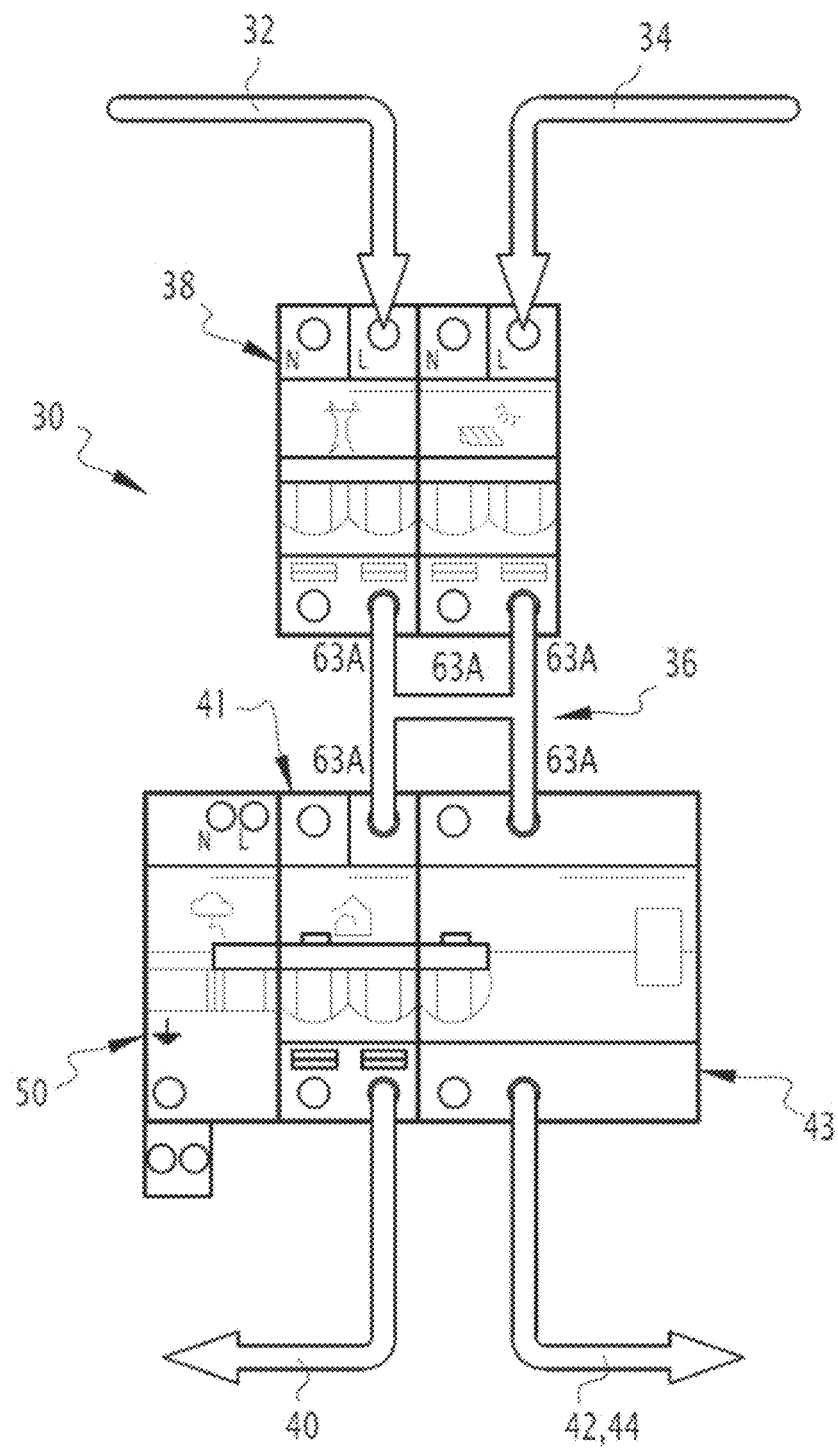
FIG. 3 schematically represents the electrical distribution system of FIG. 2.

FIG. 2 and FIG. 3 represent an embodiment according to the invention of an electricity distribution system 30 for a domestic installation 1.

In numerous embodiments, at least some of the constituents of the system 30 are accommodated in an electrical switchboard, and the latter may be at least partly installed in an electrical switchboard (for example a wall switchboard) or in an electrical enclosure.

The system is configured to be supplied by an electrical distribution network 32 (mains, grid) and by at least one secondary supply source 34. The number and nature of secondary electrical supply sources 34 may be different depending on the possible embodiments.

Preferably, at least one secondary electrical supply source 34 (or secondary generator) comprises photovoltaic (PV) panels. The installation may thus comprise one or more photovoltaic generators acting as a secondary electrical supply source to the sides of the network 32. At least one secondary electrical supply source 34 could comprise a "dimmable" on-battery electricity storage system, which may be a source or load.

The system 30 in this case comprises a connection point comprising connection terminals intended to be connected to the network 32. Depending on the embodiments, it may be a single-phase or polyphase (for example three-phase) connection point with or without a neutral line.

Figure 1:
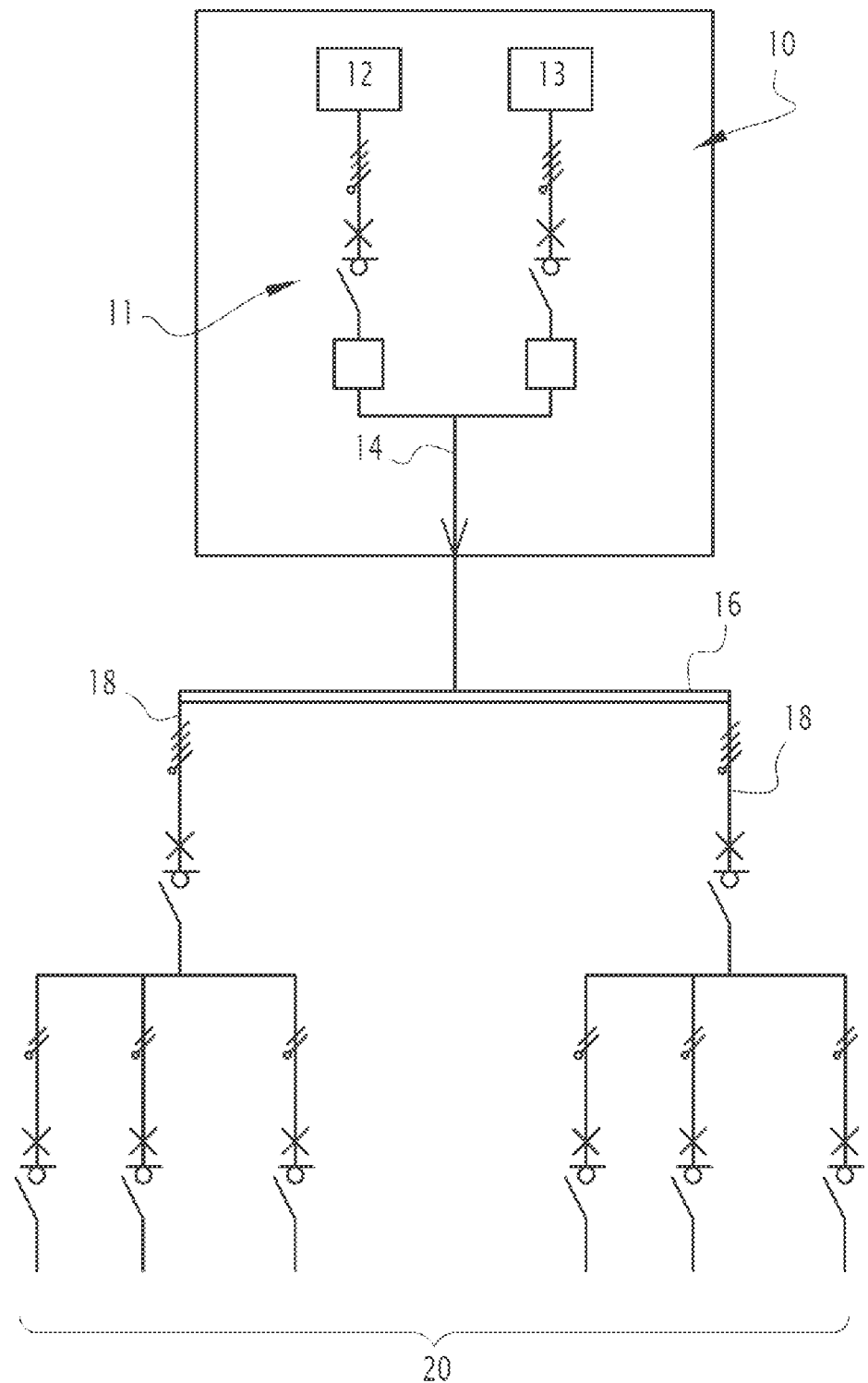
FIG. 1 schematically represents an electrical installation according to the prior art.

For example, between the system 30 and the network 32 (grid) there is a protection element, which may comprise an electrical protection unit such as a circuit breaker, a fuse or an energy meter with power limitation, for example. In the example illustrated, the protection element comprises a circuit breaker, referred to as the main circuit breaker, which corresponds to the main circuit breaker 11 described with reference to FIG. 1.

It will therefore be understood that the constraint aiming to monitor or limit the current circulating through this protection element in order not to exceed the tripping threshold I_threshold may be generalised to the case in which the protection element is not a circuit breaker. It is, for example, a case of not exceeding a current which could cause damage to an electrical conductor of the protection element.

The system 30 also comprises an electrical connection device 36 and a multi-source electrical switching unit 38.

The switching unit 38 is configured to switch between two states, closed and open, respectively allowing or preventing the circulation of electrical currents in two electrical conduction paths each comprising a plurality of electrical conductors.

The number of electrical conduction paths depends on the number of electrical phases in the electrical installation 1, and therefore for each input and for each output of the switching unit 38.

In the example illustrated, the electrical installation 1 is a single-phase installation with a neutral. Each electrical link comprises a phase conductor (denoted L) and a neutral conductor (denoted N). Likewise, as may be seen in FIG. 2, each electrical source and each electrical load comprises a phase connector (L) and a neutral connector (N). In certain cases, electrical loads may furthermore comprise an earthing conductor (denoted PE).

In this example, there are therefore two conductors (neutral N and phase L) for each conduction path.

As a variant, the number of phases could be different. For example, the electrical installation 1 could be a three-phase installation with a neutral (four conductors) or a three-phase installation without a neutral (three conductors). The number of conductors per electrical link is then adapted accordingly.

In numerous embodiments, the switching unit 38 is a circuit breaker, a contactor a relay, a switch or any equivalent switching unit. It may be an electromechanical unit or semiconductor unit, or a hybrid unit combining semiconductor switches and electromechanical switches, or any equivalent unit.

The switching unit 38 is capable of being connected to multiple independent electrical sources and multiple independent loads, each source and load pair being associated with an electrical conduction path, although the switching between the open state or closed state is carried out simultaneously for all the electrical conduction paths.

For example, the switching unit 38 comprises a first input and a second input which are separate from one another. Each input in this case comprises two electrical conductors (one for the phase L and one for the neutral N), although this number could be different as a variant, depending on the number of phases in the installation 1.

The switching unit 38 connects, on a first input, the first of the two electrical conduction paths to an electrical distribution network 32. The electrical switching unit connects, on its second input, the second of the two electrical conduction paths to the auxiliary electrical source 34.

The connection device 36 is arranged to distribute an electrical current in the installation, in the manner of a distributor.

More precisely, the connection device 36 is connected at the output of the electrical switching unit 38 and is configured to prolong the two electrical conduction paths at the output of the switching unit in order to connect each electrical conduction path to one or more electrical loads 40, 42, 44 at the output of the electrical switching unit 38. In other words, the system 30 is configured to be connected on the downstream side to a plurality of electrical loads.

For example, one portion of the electrical loads 40 is connected to the first electrical conduction path and another portion of the electrical loads 42, 44 is connected to the second electrical conduction path.

The connection device 36 is thus capable of electrically supplying the electrical loads by transferring at least a part of the electrical current generated by one or more of the electrical sources 32, 34 connected upstream. These main sources are in this case connected in parallel.

In FIG. 2, the electrical loads correspond to the references 40, 42 and 44, although it should be understood that this example is not limiting and that a different number of electrical loads may be provided as a variant.

In numerous embodiments, two types of electrical loads may be distinguished among these electrical loads: so-called critical electrical loads (or main loads) and domestic electrical loads (or secondary loads).

For example, the main electrical loads 42 and 44 correspond to electrical loads capable of consuming high electrical powers (compared with ordinary domestic electrical loads) and/or of consuming electrical currents with a high electrical intensity, and/or of being active continuously for long periods of time (for example for more than 10 hours).

For example, the main electrical loads comprise an electrical vehicle or a charging station of an electrical vehicle. In variants which are not illustrated, these loads may comprise a water heater or a heat pump (or air-conditioner, or more generally a domestic heating installation), or an air-conditioner or a swimming pool heating system.

In contrast, domestic electrical loads consume a lower electrical power and their operation is generally intermittent. For example, the domestic electrical loads are lighting elements or domestic units connected up to the domestic electrical sockets, such as household appliances, multimedia units, computer equipment, lamps, these examples not being limiting. Domestic electrical loads are generally connected to a domestic electrical switchboard 40. This domestic electrical switchboard 40 may, for example, be a conventional domestic switchboard limited to 63 A.

Two domestic electrical loads 80 and 82 are illustrated in the example of FIG. 2. For example, the first domestic load 80 is a water heater whereas the second domestic load 82 is a heat pump.

In practice, each of the said electrical loads 80, 82, 42 and 44 is connected to the connection device 36 by means of electrical conductors (or a plurality of phase and/or neutral electrical conductors, depending on the nature of the electrical installation).

The secondary electrical loads 80 and 82, the connection terminals of which are generally gathered together in a secondary panel containing the switchboard 40, are for example connected to the first output of the connection device 36 by an electrical line protected by a circuit breaker 41, the rating of which is dimensioned so as not to exceed the maximum allowable current of the secondary panel, for example 63 amperes.

The main electrical loads 42, 44 are, for example, connected to the second output of the connection device 36 by an electrical line protected by a protection unit 43 such as a circuit breaker and/or a differential protection unit, the rating of which is dimensioned so as not to exceed the maximum current, for example 63 amperes.

In numerous embodiments, as may be seen schematically in FIGS. 2 and 3, the connection device 36 comprises a plurality of electrical connection conductors, such as connection bars, connection rails or connection cables, for each electrical phase (or neutral line).

In particular, the connection device 36 comprises an interconnection point in which the corresponding electrical conductors (L, N) of each electrical conduction path are connected to one another.

For example, a first set of electrical conductors is associated with the phase L. This first set comprises at least one first conductor for forming the first electrical conduction path associated with the phase L and at least one second conductor for forming the second electrical conduction path associated with the phase L. This first set also comprises an interconnection point associated with the phase L, which connects the at least one first conductor to the said at least one second conductor. Thus, the conductors forming the first conduction path and the second conduction path of the phase L are connected to one another.

Likewise, a second set of electrical conductors is associated with the neutral N. This second set comprises at least one first conductor for forming the first electrical conduction path associated with the neutral N and at least one second conductor for forming the second electrical conduction path associated with the neutral N. This second set also comprises an interconnection point associated with the neutral N, which connects the at least one first conductor to the said at least one second conductor. Thus, the conductors forming the first conduction path and the second conduction path of the neutral N are connected to one another.

However, the electrical conductors of the first set (associated with phase L) are not in electrical contact with the electric conductors of the second set (associated with the neutral N) and remain electrically isolated from the electrical conductors of the second set (associated with the neutral N).

It will be understood that as a variant, in a polyphase, for example three-phase, system 30, this configuration may be generalised for each of the electrical phases. As many sets of electrical conductors (and interconnection points) as there are electrical phases are thus defined.

In FIG. 3, the electrical conductors of the connection device 36 are illustrated only for the electrical phase L. The electrical conductors of the connection device 36 corresponding to the neutral N are not illustrated for the sake of clarity.

For example, for each phase or neutral line, the connection device 36 has the form of an H-bridge, the interconnection point corresponding to the horizontal branch of the H-bridge which connects the other two branches of the H-bridge.

Advantageously, the electrical connection device 36 is pre-wired. For example, the electrical conductors are connected and fixed mechanically and/or mounted on a support. The electrical connection device 36 may be formed by a single preassembled piece. The conductors may at least in part be separated by insulating portions, for example in order to separate the electrical conduction paths of different polarities.

Preferably, the electrical conductors of the connection device 36 are dimensioned as a function of the maximum current allowable by the corresponding electrical loads, for example being dimensioned precisely so as not to have to overdimension the electrical conductors. This makes it possible to save on the amount of material used and therefore to reduce the cost of the installation.

For example, the electrical conductors associated with each electrical conduction path have a rating of 63 amperes, that is to say it allows the circulation of an alternating or direct current with an amplitude less than or equal to 63 amperes. Likewise, the interconnection point has a rating of 63 amperes. These values may be different as a variant.

By its design, the connection device 36 makes it possible to distribute the current coming from the sources 32 and 34 to the electrical loads 40, 42 and 44 as a function of the requirements of the loads 40, 42, 44 and the electrical power delivered by the sources 32 and 34.

The connection device 36 is simple to implement, for example simpler than manually wiring the sources and the loads to switches and to a regulating device. The manufacturing cost of the system is also reduced since it requires less in the way of conductive materials, such as copper.

The system 30 therefore makes it possible to manage multiple electrical sources of different nature efficiently and simply in the same electrical distribution installation, in particular when this installation comprises multiple electrical loads of different nature having different operating constraints.

For example, the system 30 makes it possible to receive an electrical power ranging up to 12 kW from the network 32 as well as an electrical power ranging up to 12 kW from the secondary source or sources 34. By virtue of the connection device 36 associated with the switching device 38, the system 30 can distribute the corresponding electrical currents between the loads without risk of exceeding the limits permitted for the installation 1, such as the safety threshold I_threshold defined above, or the limits imposed by the administrator of the network 32.

For example, if an electrical load such as an electrical vehicle 42, 44 temporarily requires an electrical power higher than that which one or other of the sources 32 and 34 can deliver, the interconnection point of connection device 36 makes it possible to transfer the necessary electrical power from the other electrical source.

In some embodiments, when the system 30 is configured to be connected to an electrical vehicle that can act as a reversible electricity storage device (EV to grid configuration), it is possible to dimension the connection device 36 so as to accept a current limit corresponding to the sum of the currents coming from local sources and the electrical vehicle (EV to grid), that is to say a limit of 125 amperes or more at the interconnection. The interconnection point of the connection device 36 makes it possible to transfer the necessary electrical power to the secondary sources (connected to the switchboard 40, such as the sources 80 and/or 82), without having the need to overload the sources 32 or 34.

Among the advantages of the system 30, the switching device 38 may, by virtue of its association with the connection device 36, operate as a single disconnection point (or centralised isolation), making it possible to ensure disconnection of all the sources 32 and 34 connected upstream at a single place and in a single action (a single switching unit to be manipulated to put it in the open position), ensuring intervention safety of individuals for maintenance of the switchboard.

Expressed another way, the switching unit 38 forms a single disconnection point capable of simultaneously isolating the electrical sources connected to the first input and to the second input from the rest of the electrical distribution network 30.

Optionally, as illustrated in FIGS. 2 and 3, the system 30 may comprise a lightning protection device 50. This lightning protection device is connected downstream of the connection device 36. In the example illustrated, the lightning protection device comprises one or more varistors connected between the connection device 36 and an earth connection point 52 of the electrical installation, connected to the earth connection terminal. For example, a varistor is connected to each electrical conductor (for the phase L and for the neutral N) of the first electrical conduction path downstream of the connection device 36.

As illustrated in FIG. 2, the installation 1 may optionally comprise a backup electrical source 60 comprising an electricity generating set.

In some embodiments, an electricity storage system, comprising for example a set of electrochemical batteries, could be used as a backup source 60.

The backup source 60 comprises an isolating switch 62 interlocked with the switching unit 38 and is connected to the connection device 36 (for example being connected to both conduction paths at the same time).

More precisely, the optional backup source 60 comprises a safety engagement 63, or interlocking device, which makes it possible to interlock the sources 32 and 34 with the backup source 60 in order to exclude all the main and secondary sources when operating in backup mode.

Expressed another way, the device 64 makes it possible to choose between the backup source 60, on the one hand, and the main 32 and secondary 34 sources on the other hand, in order to supply the connection device 36, while preventing the backup source 60 from being connected simultaneously with the main 32 and secondary 34 sources.

In the example illustrated, the interlocking device 63 is mechanically coupled to the switching unit 38 and to the isolating switch 62. For example, the isolating switch 62 is kept in the open state while the switching unit 38 is in the closed state, and vice versa. The interlocking device 63 may be of a mechanical, electromechanical or electronic type, although other embodiments are nevertheless possible.

In the example of FIG. 2, the backup source 60 comprises, upstream of the isolating switch 62, an electrical protection unit 64 and connection terminals 66 making it possible to connect a backup generator or an energy storage system (which is not shown in the figures).

As a variant, the backup source 60 may be omitted. In this case, the interlocking device 63 may be omitted.

In optional but nevertheless advantageous embodiments, the system 30 may also comprise an electronic control device 100, described below, which is configured to automatically generate the distribution of the electrical current between the electrical loads.

Figure 4:
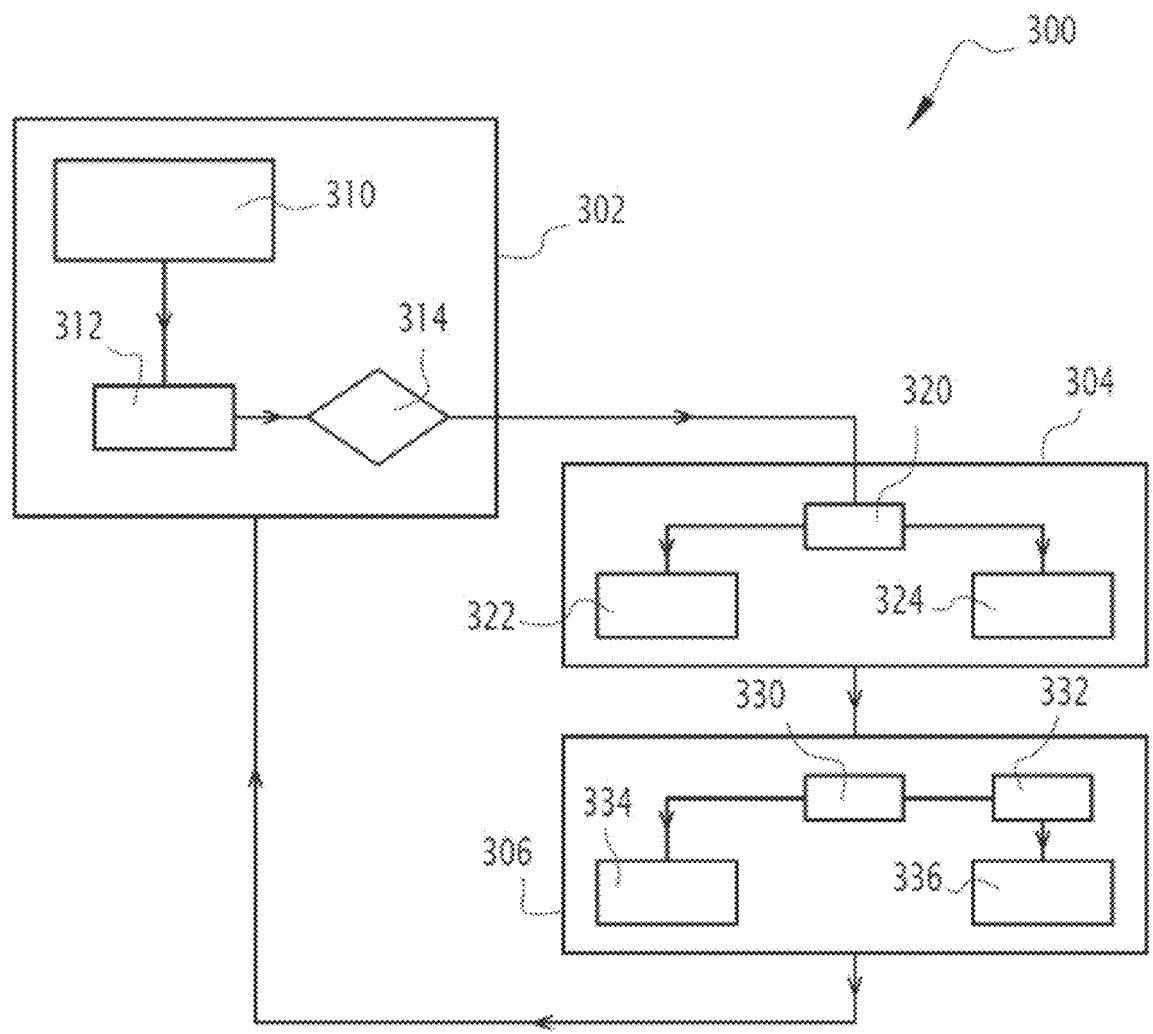
FIG. 4 schematically represents a method for operating the electrical installation of FIG. 2.

FIG. 4 represents an example of a method for managing the system 30, which may optionally be carried out by the electronic control device 100.

In numerous embodiments, the electronic control device 100 is implemented by one or more electronic circuits, for example by a programmable logic controller (PLC).

For example, the electronic control device 100 comprises a processor such as a programmable microcontroller or a microprocessor. The processor is coupled to a computer memory, or to any computer-readable data storage medium, which comprises executable instructions and/or a software code intended for carrying out a method for managing the system 30, which will be described below, when these instructions are executed by the processor.

The use of the term "processor" does not exclude the possibility that, as a variant, at least some of the functions of the electronic control device are carried out by other electronic components, such as a digital signal processor (DSP), or a reprogrammable logic component (FPGA), or an application-specific integrated circuit (ASIC), or any equivalent element, or any combination of these elements.

In particular, the electronic control device 100 is configured to manage the supply parameters of at least some of the electrical loads and/or to automatically disconnect or reconnect one or more of the electrical loads as a function of the measured current.

For example, the electronic control device 100 is connected to sensors making it possible to determine the electrical current circulating in the installation.

Preferably, the system 30 comprises devices for measuring electrical quantities, such as the electrical current and/or voltage and/or the electrical power, which are associated with the electrical loads (at least for the main loads) and with the electrical sources. These measuring devices may comprise current sensors and/or voltage sensors or any other suitable measuring unit.

The electronic control device 100 is also connected to electrical switching devices, such as remotely controllable switches, for selectively disconnecting or reconnecting one or more of the electrical loads, or even all the electrical loads. The electrical switching devices may be relays, contactors, semiconductor-based power switches, or any other equivalent unit. The electronic control device 100 may also communicate with one or more of the main electrical loads 80,82,42 and 44 with a view to modulating the electrical consumption and/or the electrical production of these sources or these loads (when they allow this or are reversible). This communication is, for example, carried out by communication devices such as a communication bus, for example in "ModBus", "Open Charge Point Protocol" (OCPP) or equivalent technology.

In particular, the control device 100 is configured, as a function of the measured current, to manage supply parameters of at least some of the electrical loads in order to reduce the electrical current consumed by these loads and/or to manage operating parameters in order to comply with the current threshold imposed by a main circuit breaker connected between the electrical installation and the electrical distribution network.

For example, this may involve automatically disconnecting or reconnecting one or more of the electrical loads as a function of the measured current in the scope of a load shedding action in order to adjust the electrical power consumed by the electrical loads as a function of the electrical power subscribed from the administrator of the network 32 (to which the threshold of the main circuit breaker 11 is calibrated) and the electrical power that the secondary source 34 is capable of providing.

Preferably, the device 30 comprises measuring devices 33, 35 capable of measuring the electrical power provided by the electrical sources (in particular by the network 32 and by the secondary source 34) and/or the electrical power flowing through the various branches of the connection device 36. These may, for example, be one or more current sensors and/or voltage sensors and/or wattmeters (W) and/or any equivalent or suitable measuring device. For example, a first measuring device 33 is associated with the network 32 whereas a second measuring device 35 is associated with the source 34.

In general, as illustrated by the diagram 300, the electronic control device 100 is configured to:

determine, by means of sensors making it possible to determine the electrical current circulating in the installation (block 302), and manage supply parameters of at least some of the electrical loads and/or automatically disconnect or reconnect one or more of the electrical loads as a function of the measured current. This corresponds to steps of load shedding (block 304) and re-establishing (block 306) the electrical loads in question.

This method makes it possible to monitor and manage the consumption of the electrical loads as a function of the contract subscribed from the administrator of the network 32, in particular so that the current provided by the network does not exceed the threshold set by the subscription (for example 40 A or 60 A) because this could lead to tripping of the main circuit breaker 11, particularly in order to detect whether the current provided by the network 32 exceeds the threshold set by the subscription (I_grid compared with the I_threshold of the element 11).

In the example illustrated, in step 302, the control device 100 measures electrical quantities by means of sensors and measuring devices and (directly and/or by calculations) determines values of electrical currents and/or values of electrical power at one or more locations W of the distribution installation.

Next, the control device 100 compares the measured quantities 310 with reference quantities, which may be protection thresholds, the exceeding of which indicates the occurrence of an overcurrent.

In some examples, the comparison may be carried out by calculating a ratio between the electrical quantities (a measured electrical quantity and a predefined limit) and comparing this ratio with a predefined numerical value.

For example, an indicator referred to as a "current ratio" is used, which is defined as being equal to the ratio of the current circulating at a point of the installation (in the distributor 36) divided by a current threshold, such as the protection threshold defined above (for example equal to 96 A or 120 A).

As a variant, a power ratio defined as being equal to the electrical power delivered by the network 32 divided by a predefined electrical power limit could be used (these powers may be instantaneous powers or powers averaged over the same period of time).

For example, at least one of the said ratios is calculated during step 312 then, in step 314, the control device 100 determines whether an overcurrent has been identified on the basis of the value of the calculated ratio or ratios.

If an overcurrent has been identified, in block 304 the control device 100 implements a load shedding method in order to interrupt the operation of at least one of the main loads, in order to reduce the electrical consumption and thus adapt the consumption as a function of the power available on the network 32 (as a function of the subscribed supply contract, which limits the power or the current available) and the power available on the secondary sources, particularly on the intermittent sources such as the photovoltaic generators when the secondary source 34 comprises such generators.

For example, during a step 320, the control device 100 automatically determines which loads can be shed. For example, a list of the electrical loads managed by the system and their characteristics is stored in memory beforehand.

This determination is, for example, carried out according to a predefined control law, for example by means of known load shedding management algorithms.

In practice, depending on the nature of the electrical loads present, it is possible to reduce their consumption gradually without entirely interrupting the electrical load (dimmable loads) or to entirely interrupt the loads (and therefore stop their consumption) by disconnecting them or turning them off.

An example of an adjustable load, the consumption of which can be varied gradually, is heating or air-conditioning equipment whose setpoint temperature can be modified in order to heat less (or cool less). It may also be a charging terminal for an electrical vehicle, the recharging rate of which is reduced.

When applicable, this regulation is carried out by means of the regulating device integrated in the corresponding electrical load.

Thus, following step 320, the control device 100 automatically sends commands to reduce the consumption of one or more loads (step 322) and/or commands to disconnect a load (step 324).

Depending on the nature of the load and its connection to the system 30, the disconnection command is sent directly to the load so that it interrupts itself, or to a switching device located between the distributor 36 and a supply input of the load, as will be explained in more detail by way of examples presented below.

Next, during step 306, the load or loads are re-established, for example once the fault condition no longer exists and/or a predetermined time lag has elapsed.

For example, during step 330, the control device 100 automatically determines which load or loads among those previously targeted can be re-established. This determination may be carried out as a function of known characteristics of said loads, following a predefined control law, in the mirror-image of the method of step 320.

Thus, following step 330, the control device 100 automatically sends commands to gradually re-establish the consumption of one or more variable loads (step 334) and/or commands to reconnect a load (step 336) after a time lag (step 332).

Step 302 is then repeated.

Figure 5:
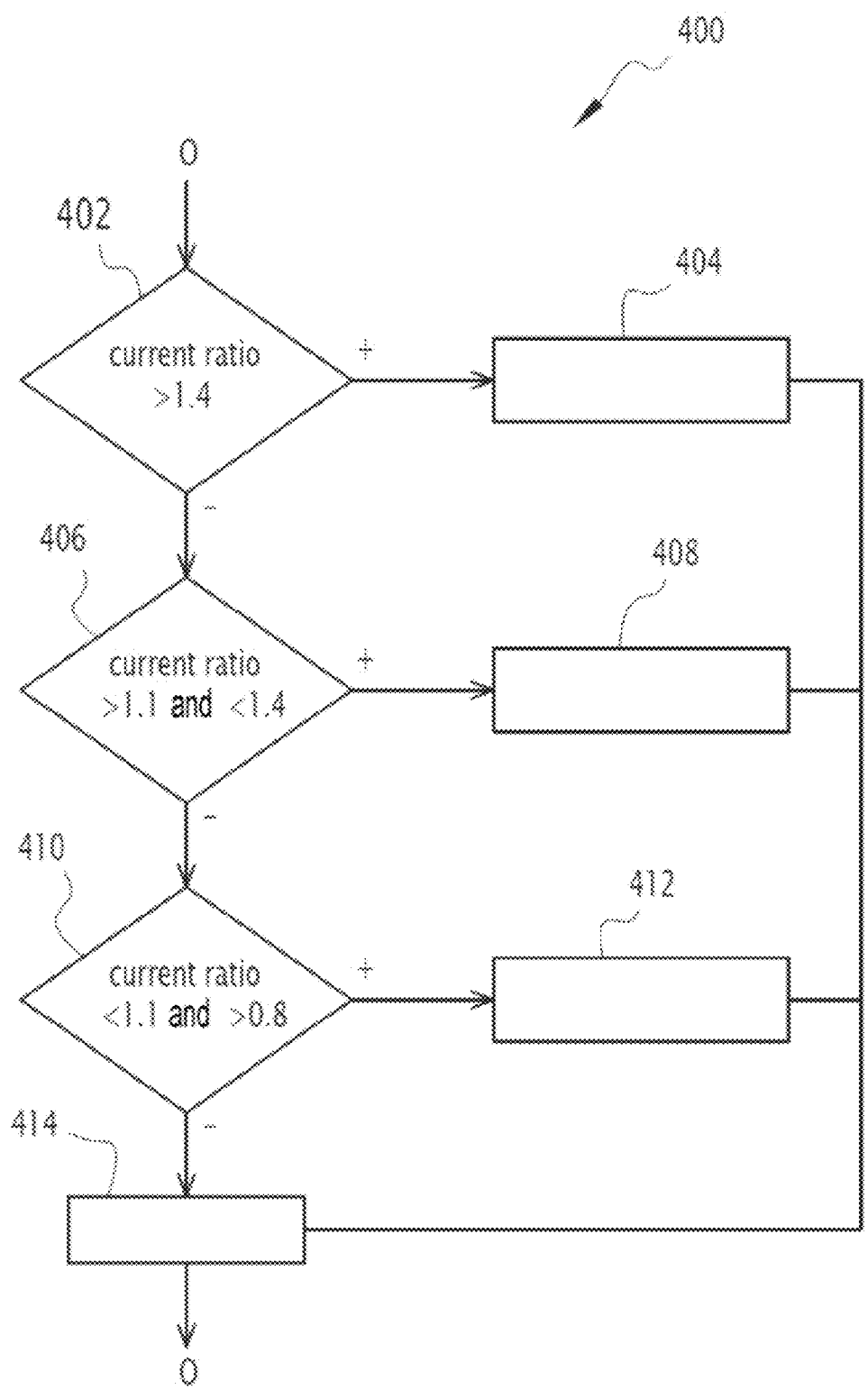
FIG. 5 schematically represents some of the steps of the operating method of FIG. 4.

FIG. 5 represents a simplified embodiment of the steps of shedding one or more electrical loads of the system of the method of FIG. 4.

The method 400, which details an operating example of the step carried out in the aforementioned block 302, starts after the ratios described above have been calculated.

In step 402, the current ratio (denoted "current_ratio" in FIG. 5) is compared with a first threshold (here selected to be equal to 1.4, although other examples are possible). If the calculated ratio is greater than the first threshold, the load or loads in question are immediately interrupted (step 404 then step 304).

In the converse case, the current ratio (current_ratio) is compared (step 406) with a second threshold (here selected to be equal to 1.1, although other examples are possible). If the calculated ratio is greater than the second threshold while being less than the first threshold, the load or loads in question are interrupted after a first time lag, for example equal to 20 seconds (step 408 then step 304).

In the event that neither of the two conditions is fulfilled, in step 410 the current ratio (denoted "current_ratio" in FIG. 5) is compared with predefined thresholds (here equal to 0.8 and 1.1, although other examples are nevertheless possible). If the calculated ratio lies between the first threshold and the second threshold, the load or loads in question are interrupted after a second time lag, for example equal to 300 seconds (step 412 then step 304).

The method ends in step 414.

As a variant, the values of the thresholds of the current ratios (first and second threshold values) could take different values. These threshold values are preferably selected as a function of the properties of the protection element 11 of the installation and the desired level of electrical protection. The same is true for the time lag values.

Figure 6:
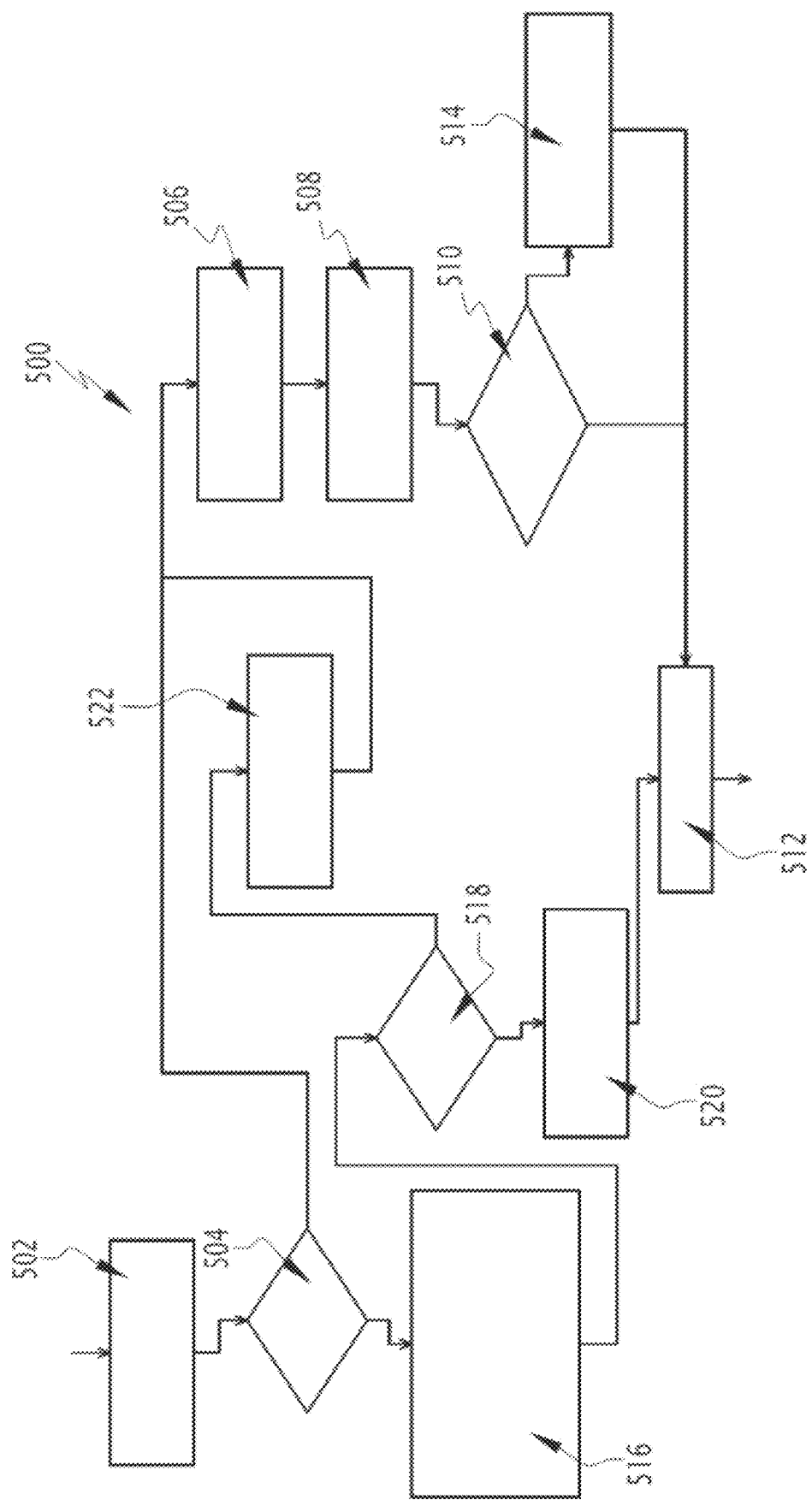
FIG. 6 schematically represents some of the steps of the operating method of FIG. 4, and FIG. 7 schematically represents some of the steps of the operating method of FIG. 4.

FIG. 6 details an operating example (method 500) of the step carried out in the aforementioned block 304 for controlling the shedding of one or more electrical loads.

In this example, the load shedding prioritises some loads rather than others (in particular the easily modulable or disconnectable loads) as a function of their nature. For example, disconnection or limitation of the load of the electrical vehicle is targeted first, followed by that of a load such as the water heater or the air-conditioning. The choice of the water heater is justified here by the fact that briefly turning off the water heater will not degrade the comfort of the users since there is a reserve of hot water which the user can draw on even when the heating means of the water heater are temporarily deactivated.

The method starts in step 502, once a load shedding command has been sent and, optionally, the period of time corresponding to the time lag has elapsed.

In step 504, the electronic control device 100 checks whether an electrical vehicle is connected to the charging terminal and checks whether the batteries of this vehicle are not full.

If no vehicle is connected or if the batteries are full, in a step 506 the water heater is temporarily interrupted. For example, the control device orders disconnection of the water heater connected to the secondary panel 40, then triggers a time countdown during which the supply of the water heater remains interrupted.

A new current ratio is calculated during step 508, then a comparison with a limit threshold is carried out during a step 510.

For example, if the entire method is carried out in order to determine whether the current being consumed is within the limits of the parameters of the subscription subscribed from the administrator of the network 32, step 510 may comprise comparison of the ratio with a first value specifically selected as a function of the threshold defined in the contract.

If the comparison shows that the new ratio is less than the limit threshold, the method 500 ends in step 512. A message may be sent to indicate that load shedding is active.

In the event that the comparison shows that the new ratio is still greater than the limit threshold, the electronic control device disconnects another electrical load.

For example, during a step 514, the heat pump is disconnected from the secondary switchboard 40 and a time lag, during which this load will not be resupplied, is imposed. The method may then end directly in step 512.

In the event that, following step 504, a vehicle has been identified as being connected to the charging terminal and its batteries are not full, indicating that the vehicle is potentially being charged, in a step 516 a new charging setpoint is calculated for the electrical vehicle, for example in order to reduce the electrical power consumed.

During a step 518, the control device checks whether the charging setpoint of the charging station is negative, indicating that the current to be reduced is more than only the demand of the electrical vehicle. If this is the case, during a step 522, a new charging setpoint is selected to be equal to zero in order to deactivate the charging terminal, and the method proceeds to the step 506 described above in order to disconnect another load.

In the event that the charging setpoint of the charging station is positive or zero, the new charging setpoint calculated is assigned to the charging terminal and will be transmitted to the electrical vehicle during a step 520. The method then ends in step 512.

Figure 7:
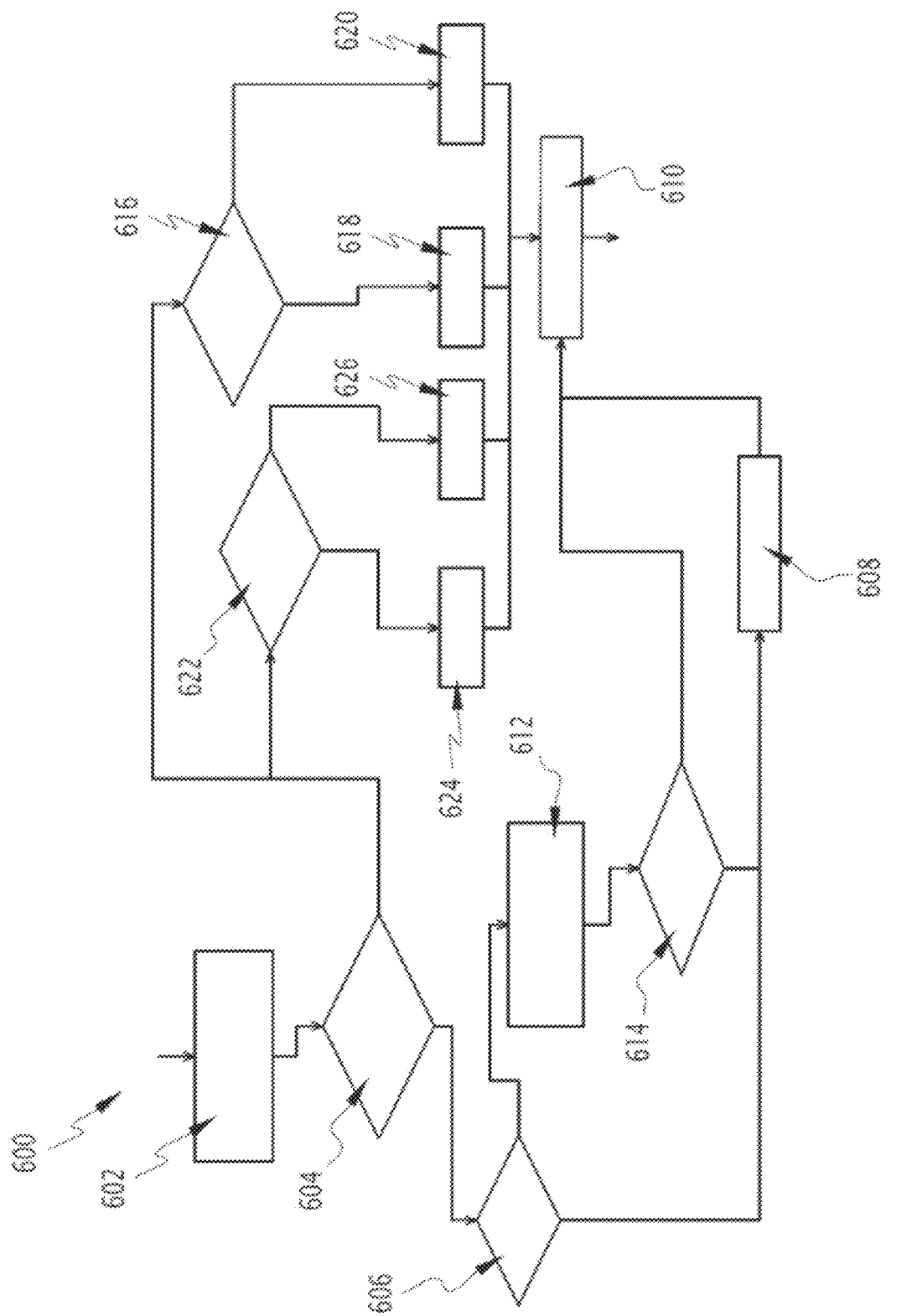

FIG. 7 details an operating example (method 600) of the step carried out in the aforementioned block 306 for reactivating one or more electrical loads once the load shedding is to be ended.

The method starts in step 602, once a command to end the load shedding has been sent.

In step 604, the electronic control device checks whether at least one or other of the water heater or the heat pump (or air-conditioner) has been turned off following the load shedding.

If neither of these loads is identified as being turned off, in a step 606 the device 100 checks whether an electrical vehicle is connected to the charging terminal and checks whether the batteries of this vehicle are not full.

If no vehicle is connected or if the batteries are full, in a step 608 a message is sent (or a register is updated) in order to indicate that the load shedding has ended. The method then ends during a step 610.

In the event that, following step 606, a vehicle has been identified as being connected to the charging terminal and its batteries are not full, indicating that the vehicle is potentially being charged, in a step 612 the control device calculates a new charging setpoint for the charging terminal, for example in order to increase the electrical power consumed by the electrical vehicle.

During a step 614, the control device 100 checks whether the new charging setpoint calculated is greater than the maximum setpoint. If this is the case, the method proceeds to step 608 and ends in step 610.

In the event that the new charging setpoint calculated is less than the maximum setpoint, step 610 is proceeded to directly.

Returning to step 604, if the control device 100 identifies that at least one of the other loads, such as the water heater 80 or the heat pump of the air-conditioner 82, is already turned off, one or more checks are instigated.

In a step 616, the device 100 checks whether the time lag imposed on the heat pump 82 (or air-conditioner) connected to the secondary switchboard 40 has reached its completion. If this is the case, in a step 618 the heat pump 82 (or air-conditioner) is reconnected. In the converse case, during a step 620, the heat pump 82 (or air-conditioner) remains disconnected. The method ends in step 610.

In parallel, in a step 622 the control device checks whether the time lag imposed on the water heater has reached its completion. If this is the case, in a step 624 the corresponding load is reconnected in order to resupply the water heater. In the converse case, during a step 626, the load remains disconnected. The method ends in step 610.

As a variant, however, these steps and this method could be entirely omitted, as could the electronic control device as well as the said measuring and controlling means (the electrical switching devices controlled by the electronic control device).

The embodiments and variants envisaged above may be combined with one another in order to give rise to new embodiments.

The invention claimed is:

1. An electrical distribution system for distributing electrical currents between an electrical distribution network and a domestic distribution installation, wherein the electrical distribution system comprises:
    a multi-source electrical switching unit configured to switch between two states respectively allowing or preventing the circulation of electrical currents in two electrical conduction paths each comprising a plurality of electrical conductors;
    an electrical connection device connected at the output of the electrical switching unit, the connection device being configured to prolong the two electrical conduction paths at the output of the switching unit;
    wherein the electrical switching unit is configured to connect, on a first input, a first of the two electrical conduction paths to an electrical distribution network, the electrical switching unit being configured to connect, on its second input, the second of the two electrical conduction paths to an auxiliary electrical source;
    wherein the connection device is configured to connect each electrical conduction path to one or more electrical loads at the output of the electrical switching unit;
    and wherein the electrical connection device comprises an interconnection point in which the corresponding electrical conductors of each electrical conduction path are connected to one another, the multi-source electrical switching unit forming a single disconnection point capable of simultaneously disconnecting the electrical sources connected to the first input and to the second input from the rest of the electrical distribution network.

2. The system according to claim 1, wherein the electrical connection device forms an H-bridge for each electrical phase or neutral line.

3. The system according to claim 1, wherein the electrical connection device comprises connection conductors made of an electrically conductive material, each connection conductor being associated with an electrical phase or with a neutral line.

4. The system according to claim 1, wherein the electrical connection device comprises, for each electrical phase or neutral line, a set of electrical conductors comprising:
    at least one first conductor for forming the first electrical conduction path associated with the phase or neutral line,
    at least one second conductor for forming the second electrical conduction path associated with the phase or neutral line, and
    an interconnection point associated with the phase or neutral line, which connects the at least one first conductor to the said at least one second conductor of the phase or neutral line.

5. The system according to claim 1, wherein each interconnection point of the electrical connection device has a rating of 63 amperes.

6. The system according to claim 1, wherein each interconnection point of the electrical connection device has a rating of 125 amperes.

7. The system according to claim 1, wherein each of the first electrical conduction path and the second electrical conduction path of the electrical connection device has a rating of 63 amperes.

8. The system according to claim 1, wherein one portion of the electrical loads is capable of being connected to the first electrical conduction path and another portion of the electrical loads is capable of being connected to the second electrical conduction path.

9. The system according to claim 1, wherein the auxiliary electrical source comprises one or more photovoltaic generators.

10. An electrical distribution installation, in particular for domestic use, comprising an electrical distribution system according to claim 1.

* * * * *